(12) United States Patent
Jansen et al.

(10) Patent No.: US 6,722,769 B2
(45) Date of Patent: Apr. 20, 2004

(54) DISPLAY DEVICE

(75) Inventors: Norbert Erwin Therenzo Jansen, Eindhoven (NL); Richard Van Der Laan, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 288 days.

(21) Appl. No.: 10/022,167

(22) Filed: Dec. 13, 2001

(65) Prior Publication Data
US 2002/0097219 A1 Jul. 25, 2002

(30) Foreign Application Priority Data
Dec. 18, 2000 (EP) .............................. 00204634

(51) Int. Cl.$^7$ ............................................ G03B 21/14
(52) U.S. Cl. .................... 353/31; 353/119; 353/122; 248/918
(58) Field of Search ................... 353/30, 31, 100, 353/119, 121, 122, DIG. 5; 248/917–922

(56) References Cited

U.S. PATENT DOCUMENTS

| | | | | |
|---|---|---|---|---|
| 5,092,671 A | * | 3/1992 | Van Os | 353/31 |
| 5,653,522 A | * | 8/1997 | Loucks | 353/122 |
| 6,345,895 B1 | * | 2/2002 | Maki et al. | 353/33 |
| RE38,306 E | * | 11/2003 | Fujimori et al. | 353/119 |

\* cited by examiner

Primary Examiner—Russell Adams
Assistant Examiner—Michael Dalakis

(57) ABSTRACT

The invention relates to an image display device comprising at least three light panels for emitting at least three light beams having different colors, combination means which are rigidly connected to a frame for combining the three light beams to a combined light beam for projection on a screen, positioning means for spatially positioning the three light panels and fixation means for fixing a position, adjusted with the aid of the positioning means, of the individual light panels with respect to the combination means, wherein the positioning means comprise three plate-shaped elements for each light panel, which elements are oriented at right angles to the associated light panel and are each rigidly connected to the frame along a connecting edge, and are each pivotally connected to the associated light panel at a distance from the connecting edge.

11 Claims, 2 Drawing Sheets

DISPLAY DEVICE

The invention relates to a display device comprising at least three light panels for emitting at least three light beams having different colors, combination means which are rigidly connected to a frame for combining the three light beams to a combined light beam for projection on a screen, positioning means for spatially positioning the three light panels, and fixation means for fixing a position, adjusted with the aid of the positioning means, of the individual light panels with respect to the combination means.

Within the scope of this invention, the term light panel is to be understood to mean at least transmissive liquid crystal displays or LCDs, reflective liquid crystal displays, or R-LCDs, and digital mirror devices, or DMDs. Such optical components are generally known to those skilled in the art and do not need any further explanation.

In display devices according to the invention, in which a plurality of light beams is combined to a combined light beam for projection on a screen, it is of great importance that the relevant light panels are positioned correctly with respect to the combination means and with respect to each other in order to obtain a sharply focused image on the screen, while the light beams converge in the correct manner. Since the light panels are considerably smaller as compared with the ultimate image, which may have a main dimension of 35 mm, it is necessary to position the light panels within a tolerance of approximately ±5 micrometers with respect to the combination means, such as a prism. Since it is economically not feasible to obtain such accuracies as measuring tolerances for the components of the display devices, it is known to correctly position the light panels with respect to the frame by means of an external manipulator and by subsequently fixing this position.

United States patent U.S. Pat. No. 5,653,522 describes a display device as mentioned in the opening paragraph, in which a transmissive light panel is secured to mounting brackets by means of three fixation elements, a first fixation element in the form of a rod being rigid in all directions along the surface area of the light panel, a second fixation element in the form of a clamp being rigid in a direction of the light panel, and a third fixation element, also in the form of a clamp being rigid in a direction perpendicular to the rigid direction of the second fixation element. Such a way of fixation envisages absorption of thermal expansions during heating without stress in the construction. During manufacture of the display device, the fixation elements are maneuvered into their correct position after which they are rigidly connected to the relevant light panel by means of an adhesive which cures under the influence of ultraviolet light. The drawback of such a fixation method is that manipulation of the light panel is only possible to a limited extent so that the tolerance requirements which are imposed on the production process of the individual components as well as on the assembly process are relatively stringent. This manipulation is notably possible in a limited manner in the direction which is necessary for focusing the image.

It is an object of the invention to provide a display device which offers a solution, either or not in a preferred embodiment. In addition, the display device should be defined completely statically so that the risk of mechanical stress in the light panel is reduced considerably. Such stress might give rise to a disturbance of the image. To this end, the invention is characterized in that the positioning means comprise three plate-shaped elements for each light panel, which elements are oriented at right angles to the associated light panel and are each rigidly connected to the frame along a connecting edge, and are each pivotally connected to the associated light panel at a distance from the connecting edge. Within the scope of this invention, pivotal is to be understood to mean the pivotability to an extent which is necessary for correctly positioning the light panels.

Plate-shaped elements which are rigidly incorporated in a frame along an edge, such as a leaf spring, have the property that they have a great rigidity as regards the three degrees of freedom (twice translation, once rotation) extending in the plane of the plate-shaped element. The three other degrees of freedom (once translation, twice rotation) extending from the plane of the plate-shaped element have, however, a relatively small rigidity. The invention advantageously utilizes this property by transferring these properties of rigidity to the light panel by means of the pivotal connection. An exception is the relatively rigid rotation in the plane of the plate-shaped element. Due to the pivotal character of the connection between the plate-shaped element and the associated light panel, the light panel does not behave rigidly as regards rotation about an axis perpendicular to the plate-shaped element. Limited movements of the light panel, as are required for focusing and converging the light panels, are possible in principle, in so far as these take place perpendicularly to the plane of the plate-shaped elements. In principle, also the rotation of the light panel may take place in the plane of the plate-shaped element. Per plate-shaped element, two degrees of freedom are thus taken from the associated light panel. By using three plate-shaped elements per light panel, all of the six degrees of freedom of the light panel can thus be fixed. After the light panel has been brought to the correct spatial position with respect to the combination means and the other light panels by way of manipulation, this correct position is fixed by the action of the fixation means.

By orienting the plate-shaped elements at an angle to the associated light panel, an optimum rigidity of the connection between light panel and plate-shaped elements is obtained.

The same also applies if two of the plate-shaped elements are oriented perpendicularly to each other.

If two of the plate-shaped elements are oriented parallel to each other, They can be caused to coincide with two opposite edges of the light panel.

In accordance with a special preferred embodiment, all plate-shaped elements substantially extend within the perpendicular projection of the associated light panel. A compact construction is obtained in this way.

If at least one, and preferably all plate-shaped elements, are connected to the associated light panel on the side facing the connecting edge, optimum use is made of the material of the plate-shaped elements so that the ratio between the occupation of the space and the rigidity obtained remains as small as possible.

For the pivotal connection between the plate-shaped element and the associated light panel, each plate-shaped element is preferably provided with a lateral projection extending rotatably into a recess of the associated light panel. Such a projection may be provided, for example, immediately during punching of the plate-shaped elements.

The projection is connected to the recess preferably by means of a flexible adhesive joint. The flexible adhesive joint allows pivoting to an extent which is sufficient for focusing and converging the relevant light panel.

In accordance with a special preferred embodiment, the fixation means comprise clamping means for each plate-shaped element for detachably and rigidly connecting the connecting edge of the plate-shaped element to the frame. The detachable character of such a connection provides the possibility of separately replacing defective light panels.

A particularly simple embodiment of such clamping means is obtained if they are substantially U-shaped. The clamping surfaces are then formed by the inner side of the legs of the U, while the underlying back of the U provides the possibility of bending both legs towards each other.

The clamping means preferably have a length which is at least as large as the length of the connecting edge so that an optimum rigid connection is obtained along this connecting edge which does not allow any rotation of the clamped plate-shaped element about an axis perpendicular to the plane of the plate-shaped element.

These and other aspects of the invention are apparent from and will be elucidated with reference to the embodiments described hereinafter.

Figure 1:
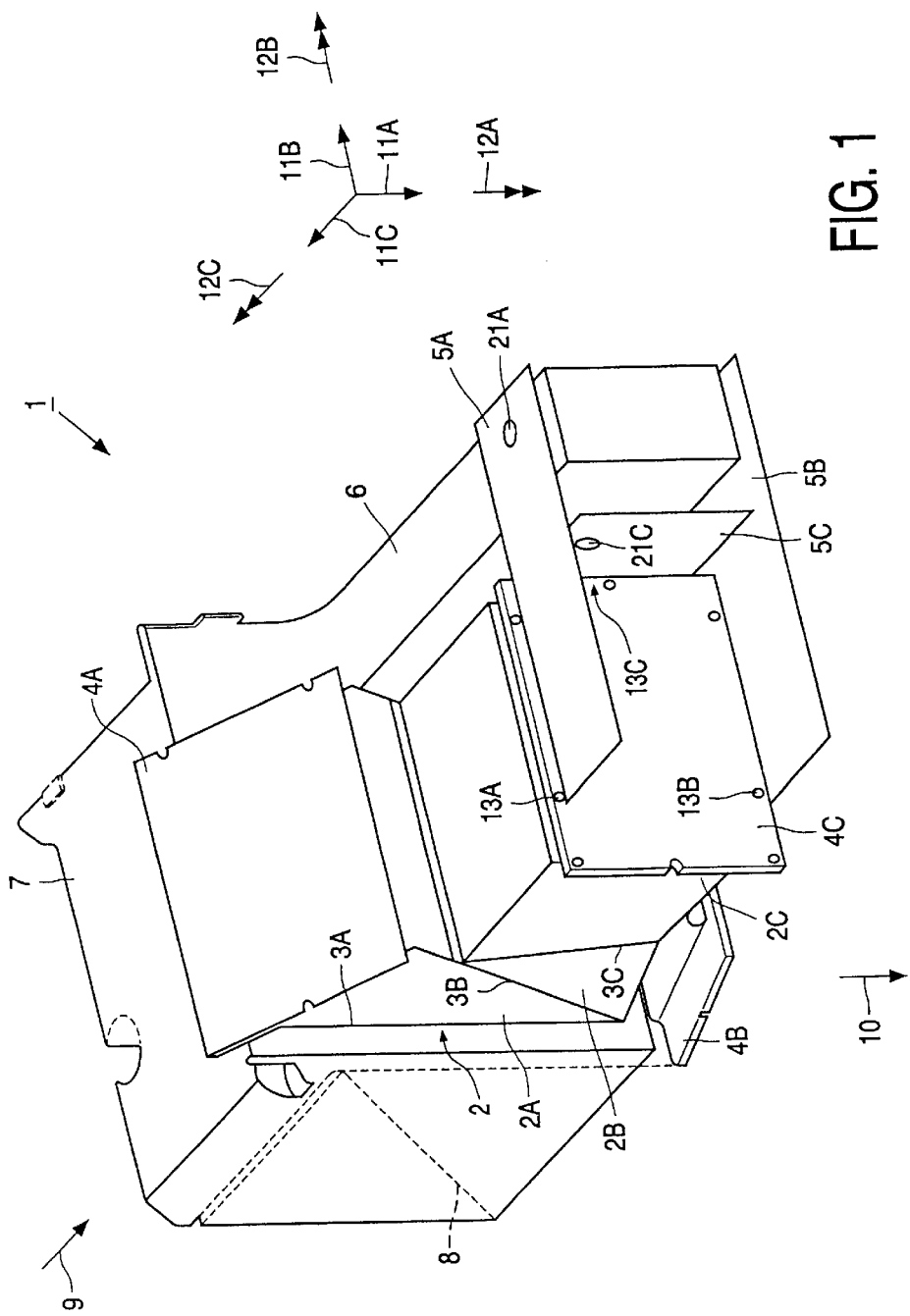
FIG. 1 is a perspective elevational view of a part of the optical system of a display device according to the invention.

FIG. 1 shows a part of an optical system of a display device according to the invention. As will be apparent from the following text, a plurality of components is not shown in FIG. 1 for the sake of clarity. For these components, reference is made to FIGS. 2 and 3. FIG. 1 shows a unit 1 forming part of a display device. The optical unit 1 comprises a prism 2 as is also shown in, for example, FIG. 7 of U.S. Pat. No. 5,653,522 when used in combination with LCDs as light panels. The prism 2 is substantially constituted by three prism segments 2A, 2B, 2C with reflection faces 3A, 3B and 3C in the transverse direction, the latter two of which faces are dichroic, i.e. they are only sensitive to a given color. Dependent on the wavelength, these reflection faces have the property of reflecting or refracting incident light, wherein the angle of incidence is equal to the exit angle. Light panels in the form of R-LCDs 4A, 4B and 4C are arranged on the outer side of each prism segment 3A, 3B, 3C parallel to the associated prism segments. For connecting purposes, each R-LCD has a frame (not shown) on its periphery. Three leaf springs 5A, 5B and 5C are shown exclusively for R-LCD 4C, which leaf springs are secured in a way to be described to the frame 6, at one end, and to the frame of R-LCD 4C, at the other end. The leaf springs 5A and 5C are parallel to each other, whereas leaf spring 5B is oriented perpendicularly with respect to leaf springs 5A and 5C. The leaf springs 5A, 5B and 5C have an equal width. The active length of leaf springs 5A and 5B is twice as large as that of leaf spring 5C so that the combined rigidity of leaf springs 5A and 5B is equally large as that of leaf spring 5C. Although this is not shown, the R-LCDs 4A and 4B are also provided with such leaf springs in the same arrangement. Prism 2 as well as a polarizing beam splitter 7 (hereinafter referred to as PBS) are rigidly connected to the frame 6. In PBS 7, a polarization reflection face 8 is incorporated at an angle of 45° which will reflect a light beam exclusively at a given state of polarization of this light beam.

Optical unit 1 operates as follows. White light coming from a light source (not shown) propagates in a polarized state to the optical unit 1 in the entrance direction 9. The light has such a polarization that the path of the light is not affected by the polarization reflection face 8. After passage through PBS 7, the light enters prism 2 which splits the white light into the three colors red, blue and green, which colors are passed to the R-LCDs 4A, 4B and 4C, respectively. To this end, the red fraction reflects on dichroic face 3B and reflection face 3A, the blue light passes dichroic face 3B whereafter it reflects on faces 3C and 3B consecutively, while the green fraction will pass the faces 3A, 3B and 3C unhindered. From the R-LCDs which, as its name already states, reflect the light, the light continues in the opposite direction, following the same path. The R-LCDs 4A, 4B and 4C have the property of polarizing the incident light through 90° so that the polarization reflection face 8 will reflect in the exit direction 10 for the returning light which is combined again from dichroic face 3B.

During the manufacture of the optical unit 1, it is of great importance for its operation that R-LCDs 4A, 4B and 4C are correctly fixed with respect to prism 2 and with respect to each other so as to obtain an optimum image quality. To this end, use is made of an external manipulator which is capable of spatially positioning the three R-LCDs 4A, 4B and 4C in a correct mutual relationship.

Similarly as, in principle, every body, the individual R-LCDs 4A, 4B and 4C have six degrees of freedom each, namely translations in the x, y and z directions, denoted by single arrows 11A, 11B, 11C, and rotations about axes parallel to the x, y and z directions, denoted by double arrows 12A, 12B and 12C. When starting the operation of positioning the R-LCDs 4A, 4B and 4C in the correct manner, the leaf springs 5A, 5B and 5C are connected to the relevant R-LCD at the location of points 13A, 13B and 13C, respectively.

Figure 2:
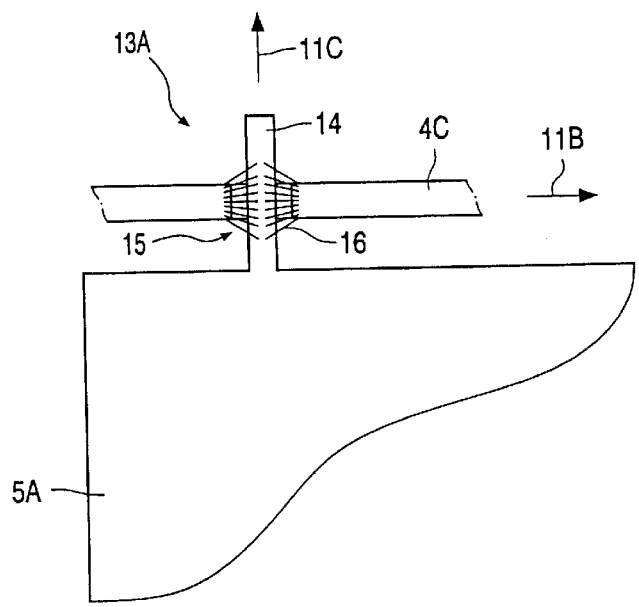
FIG. 2 is a perpendicular diagrammatic plan view of the fixation of a light panel.

FIG. 2 shows the way of fixation in greater detail. For this fixation, leaf spring 5A has a pin-shaped projecting part 14 at the location of fixation point 13a. This pin-shaped part 14 projects through an aperture 15 which is provided in the frame of R-LCD 4C. The connection is established by means of an adhesive joint 16 having such mechanical properties that a relatively rigid connection is obtained between leaf spring 5A and R-LCD 4C in the directions 11B and 11C, while only a limited rigidity is obtained as regards the other degrees of freedom. Adhesive joint 16 behaves, as it were, as a ball bearing or shoulder bearing pivot, also because of its relatively small dimensions. This limited rigidity leaves some freedom of movement of R-LCD 4C as regards said other degrees of freedom, so that it is prevented that R-LCD 4C is overdefined, which might lead to mechanical stress in R-LCD 4C. The connection between the leaf springs 5B and 5C, at one end, and R-LCD 4C, at the other end, is established in the same way. Per leaf spring, two degrees of freedom are taken from the R-LCD 4C, while a statically defined situation is achieved by virtue of the triangular connection. This situation is not achieved until after the leaf springs 5A, 5B and 5C are fixedly connected to the frame.

Figure 3:
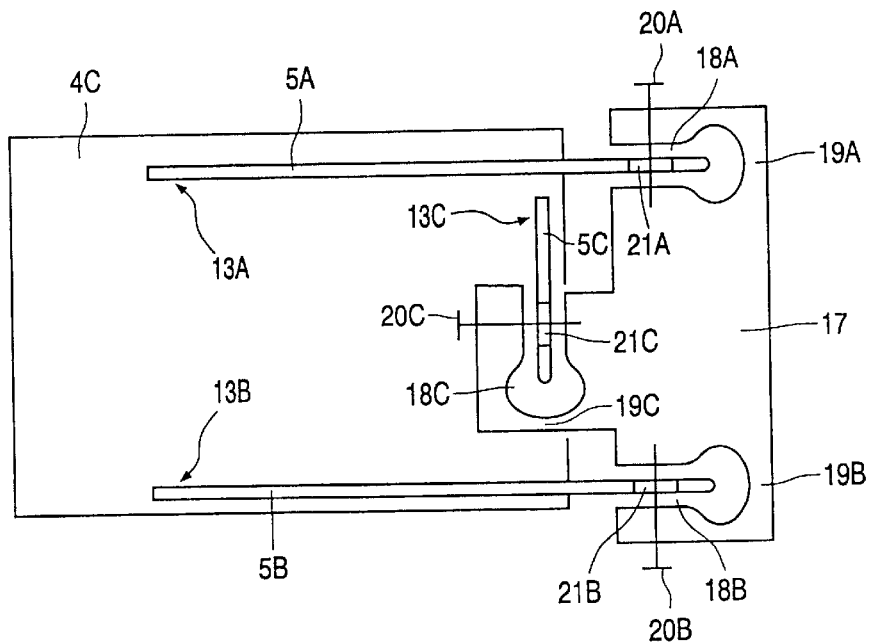
FIG. 3 is a diagrammatic elevational view of the connections between the leaf springs and a light panel.

This fixation of the leaf springs 5A, 5B and 5C and hence of the associated light panel 4C as well as of the other light panels may be realized in a way as is shown in FIG. 3. To this end, the connection block 17 is provided which is rigidly connected to the frame 6 in a manner not further shown. Connection block 17 has a width perpendicular to the plane of the drawing and equal to the widths of leaf springs 5A, 5B and 5C. Per leaf spring 5A, 5B or 5C, connection block 17 is provided with keyhole-shaped recesses 18A, 18B, 18C. A small bridge thickness 19A, 19B, 19C is left between the keyhole-shaped recesses 18A, 18B, 18C and the free edge of the connection block 17 located opposite the associated leaf spring 5A, 5B, 5C, so that the respective edges of recesses 18A, 18B, 18C can be bent towards each other under the influence of a bending force which can be brought about by bolts 20A, 20B, 20C, so that these recesses can give the respective leaf springs 5A, 5B, 5C a clamping fit. This is not to be done until after the associated R-LCD 4C and the other R-LCDs 4A and 4B have been positioned in the correct manner. To allow freedom of movement, which is necessary for correctly positioning the R-LCDs, holes 21A, 21B, 21C having dimensions which are larger than those of the bolts 20A, 20B and 20C are provided in the leaf springs 5A, 5B, 5C at the location of the bolts 20A, 20B, 20C.

What is claimed is:

1. A display device comprising at least three light panels for emitting at least three light beams having different colors, combination means which are rigidly connected to a frame for combining the three light beams to a combined light beam for projection on a screen, positioning means for spatially positioning the three light panels, and fixation means for fixing a position, adjusted with the aid of the positioning means, of the individual light panels with respect to the combination means, characterized in that the positioning means comprise three plate-shaped elements for each light panel, which elements are oriented at right angles to the associated light panel and are each rigidly connected to the frame along a connecting edge, and are each pivotally connected to the associated light panel at a distance from the connecting edge.

2. A display device as claimed in claim 1, characterized in that the plate-shaped elements are oriented at right angles to the associated light panel.

3. A display device as claimed in claim 1, characterized in that two plate-shaped elements are oriented perpendicularly to each other.

4. A display device as claimed in claim 1, characterized in that two plate-shaped elements are oriented parallel to each other.

5. A display device as claimed in claim 1, characterized in that at least one and preferably all plate-shaped elements substantially extend within the perpendicular projection of the associated light panel.

6. A display device as claimed in claim 1, characterized in that at least one and preferably all plate-shaped elements are connected to the associated light panel on the side facing the connecting edge.

7. A display device as claimed in claim 1, characterized in that each plate-shaped element has a lateral projection extending rotatably into a recess of the associated light panel.

8. A display device as claimed in claim 7, characterized in that the projection is connected to the recess by means of a flexible adhesive joint.

9. A display device as claimed in claim 1, characterized in that the fixation means comprise clamping means for each plate-shaped element for detachably and rigidly connecting the connecting edge of the plate-shaped element to the frame.

10. A display device as claimed in claim 9, characterized in that the clamping means are substantially U-shaped.

11. A display device as claimed in claim 9, characterized in that the clamping means have a length which is at least as large as the length of the connecting edge.

* * * * *